US007715834B2

(12) United States Patent
Hibino

(10) Patent No.: US 7,715,834 B2
(45) Date of Patent: *May 11, 2010

(54) WIRELESS COMMUNICATION SYSTEM, DEVICE, AND METHOD OF SETTING UP WIRELESS COMMUNICATION ADAPTER

(75) Inventor: Masaaki Hibino, Yokkaichi (JP)

(73) Assignee: Borther Kogyo Kabushiki Kaisha, Nagoya-shi, Aichi-ken (JP)

( * ) Notice: Subject to any disclaimer, the term of this patent is extended or adjusted under 35 U.S.C. 154(b) by 309 days.

This patent is subject to a terminal disclaimer.

(21) Appl. No.: 11/289,575

(22) Filed: Nov. 30, 2005

(65) Prior Publication Data
US 2006/0116166 A1 Jun. 1, 2006

(30) Foreign Application Priority Data
Dec. 1, 2004 (JP) ............... 2004-348795

(51) Int. Cl.
  H04M 3/00 (2006.01)
  H04B 1/38 (2006.01)
  H04B 7/00 (2006.01)
  G06F 15/177 (2006.01)
  G06F 13/14 (2006.01)
  G06F 15/173 (2006.01)
(52) U.S. Cl. .................. 455/420; 455/557; 455/418; 455/41.2; 709/221; 709/220; 709/223; 710/305
(58) Field of Classification Search .......... 455/556.1, 455/557, 41.2, 418, 90.1, 90.2, 420, 559; 709/221, 222, 220, 223; 710/305; 358/1.15, 358/302; 348/207.2
See application file for complete search history.

(56) References Cited

U.S. PATENT DOCUMENTS

| 5,386,455 | A | 1/1995 | Cooper |
| 6,195,171 | B1 | 2/2001 | Ochiai |
| 6,754,725 | B1 | 6/2004 | Wright et al. |
| 7,290,067 | B2 * | 10/2007 | Fukunaga et al. ............ 710/8 |
| 2003/0128281 | A1 | 7/2003 | Nihei et al. |

(Continued)

FOREIGN PATENT DOCUMENTS

EP 0 891 047 1/1999

(Continued)

OTHER PUBLICATIONS

EP Search Report dtd Mar. 1, 2006, EP Appln. 05257068.6.

(Continued)

Primary Examiner—Un C Cho
(74) Attorney, Agent, or Firm—Banner & Witcoff, Ltd.

(57) ABSTRACT

A wireless communication system is provided. The wireless communication system includes a wireless communication adapter configured for wireless communication, a storage device configured to store setting information for the wireless communication adapter, and a device that has an interface configured to be connected to the storage device and the wireless communication adapter. Further, the device includes a controller configured to obtain the setting information from the storage device if the storage device is connected to the interface of the device, and to apply the setting information to the wireless communication adapter if the wireless communication adapter is connected to the interface of the device. The wireless communication adapter performs wireless communication in accordance with the setting information after the setting information is applied to the wireless communication adapter.

19 Claims, 11 Drawing Sheets

U.S. PATENT DOCUMENTS

| | | | |
|---|---|---|---|
| 2003/0163626 A1* | 8/2003 | Chen et al. | 710/305 |
| 2004/0090984 A1 | 5/2004 | Saint-Hilaire et al. | |
| 2004/0102218 A1 | 5/2004 | Nago | |
| 2004/0125782 A1 | 7/2004 | Chang | |
| 2004/0137935 A1 | 7/2004 | Zarom | |
| 2004/0214560 A1* | 10/2004 | Date et al. | 455/418 |
| 2005/0080973 A1 | 4/2005 | Lee | |
| 2005/0198233 A1* | 9/2005 | Manchester et al. | 709/221 |
| 2005/0262223 A1 | 11/2005 | Kimura | |
| 2006/0104238 A1 | 5/2006 | Hibino | |
| 2006/0190238 A1 | 8/2006 | Autor et al. | |

FOREIGN PATENT DOCUMENTS

| | | |
|---|---|---|
| JP | 8-314646 A | 11/1996 |
| JP | 8-314845 A | 11/1996 |
| JP | 10-326184 A | 12/1998 |
| JP | 11-134271 A | 5/1999 |
| JP | 2002-091709 A | 3/2002 |
| JP | 2002-108732 A | 4/2002 |
| JP | 2002-176456 A | 6/2002 |
| JP | 2002-271537 A | 9/2002 |
| JP | 2004-013718 A | 1/2004 |
| JP | 2004-173208 A | 6/2004 |
| JP | 2004-266606 A | 9/2004 |
| JP | 2005-285091 A | 10/2005 |
| JP | 2006-148311 A | 7/2008 |
| WO | WO-94/09586 | 4/1994 |
| WO | WO-98/48522 | 10/1998 |

OTHER PUBLICATIONS

U.S. Office Action dtd Jan. 10, 2008, U.S. Appl. No. 11/274,507.
JP Office Action dtd Apr. 8, 2008, JP Appln. 2004-348795.
Notification of Reasons of Rejection dispatched Feb. 17, 2009 in Japanese Application No. JP2004-348795 and English translation thereof.
US Office Action dtd Oct. 30, 2008, U.S. Appl. No. 11/274,507.
US Office Action dtd Jun. 25, 2009, U.S. Appl. No. 11/274,507.

* cited by examiner

WIRELESS COMMUNICATION SYSTEM, DEVICE, AND METHOD OF SETTING UP WIRELESS COMMUNICATION ADAPTER

CROSS REFERENCE TO RELATED APPLICATIONS

This application claims priority under 35 U.S.C. §119 from Japanese Patent Application No. 2004-348795, filed on Dec. 1, 2004, the entire subject matter of which is incorporated herein by reference.

BACKGROUND

Technical Field

Aspects of the present invention relate to a wireless communication system in which a wireless communication adapter is attached to a predetermined device (e.g., an image processing device) for wireless communication.

Wired LANs (local area networks) have been widely used. For building a wired LAN, for example, in an office, users are required to connect cables to various types of devices, such as PCs (personal computers), printing devices, scanners and digital multifunction devices. To avoid such a hassle to set up the wired LAN, wireless LANs are sometimes used.

In general, devices (e.g., a PC, a printer, and a digital multifunction device) are provided with a built-in wired LAN communication interface. However, since a wireless communication module is relatively expensive, many devices are not provided with a built-in wireless communication interface. Therefore, wireless communication adapters are used as add-on options.

For building a wireless LAN, a user is required to connect a wireless communication adapter to his device and to set up the wireless communication adapter so that the device can communicate with other devices (nodes) through the wireless LAN. Frequently, the user is required to set up security related settings for the wireless communication adapter because there is a possibility that information on a wireless communication may be easily intercepted. For example, data is encrypted by use of a particular code (an encryption key) so that the data can be exchanged only between devices sharing the particular code. That is, the user adjusts the settings of the wireless communication adapter to encrypt data using the particular code.

As described above, setting up a wireless LAN interface tends to be more complicated than setting up a wired LAN interface.

SUMMARY

Aspects of the present invention include a wireless communication system in which a wireless communication function for a device is provided, the device being connected to a wireless communication adapter.

DETAILED DESCRIPTION

General Overview

A wireless communication system is provided. The wireless communication system includes a wireless communication adapter configured for wireless communication, a storage device configured to store setting information for the wireless communication adapter, and a device that has an interface configured to be connected to the storage device and the wireless communication adapter. In further aspects, the device includes a controller configured to obtain the setting information from the storage device if the storage device is connected to the interface of the device, and to apply the setting information to the wireless communication adapter if the wireless communication adapter is connected to the interface of the device. The wireless communication adapter can perform wireless communication in accordance with the setting information after the setting information is applied to the wireless communication adapter.

With this configuration, a user does not have to operate the device to apply the setting information to the wireless communication adapter. In other words, the user may apply the setting information to the wireless communication adapter without operating the device. It should be noted that the operation to apply the setting information to the wireless communication adapter is simple. The user is only required to connect the storage device and the wireless communication adapter to the device. That is, a setup operation for setting up a wireless communication function of the device may become less difficult.

It is noted that various connections are set forth between elements in the following description. It is noted that these connections in general and unless specified otherwise, may be direct or indirect and that this specification is not intended to be limiting in the respect. Aspects of the invention may be implemented in computer software as programs storable on computer-readable media including but not limited to RAMs, ROMs, Flash memory, EEPROMs, CD-media, DVD-media, temporary storage, hard disk drives, floppy drives, permanent storage, and the like.

Hereafter, illustrative aspects according to the invention will be described with reference to the accompanying drawings.

Figure 1:
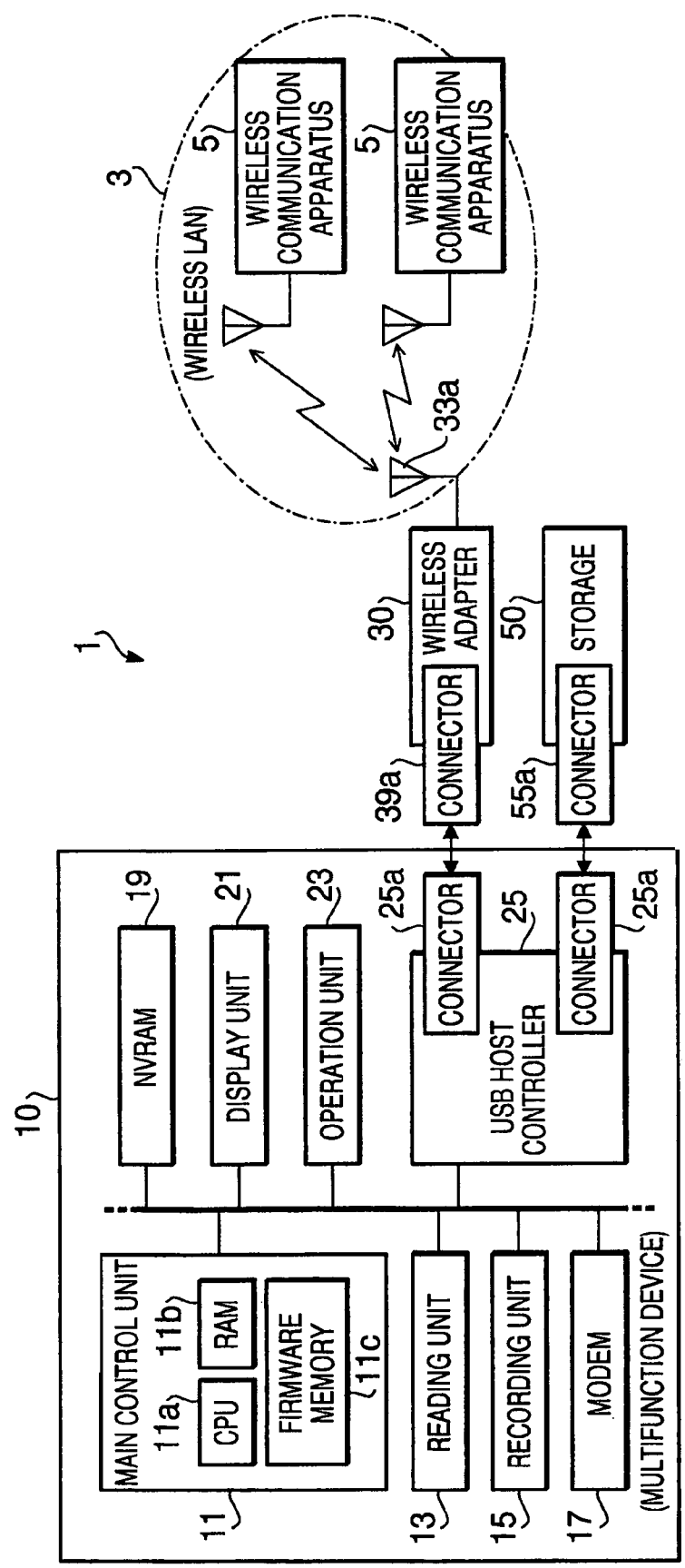
FIG. 1 is a block diagram of a wireless communication system.

FIG. 1 is a block diagram of a wireless communication system 1 according to aspects of the invention. The wireless communication system 1 includes a digital multifunction device 10 (hereafter, simply referred to as a multifunction device 10), a wireless communication adapter 30, and a storage device 50. As described in detail below, the multifunction device 10 has USB (Universal Serial Bus) interface connectors to which the wireless communication adapter 30 and/or the storage device 50 can be detachably connected. The multifunction device 10 is configured to have functions including a scanning function, a printing function, a copying function and a facsimile function.

As shown in FIG. 1, the multifunction device 10 has a main control unit 11, a reading unit 13, a recording unit 15, a modem 17, an NVRAM (non-volatile RAM) 19, a display unit 21, an operation unit 23 and an USB host controller 25. These internal components of the multifunction device 10 operate under control of the main control unit 11. The main control unit 11 includes a CPU (central processing unit) 11a which executes various types of programs, a RAM 11b used for a work memory for execution of the programs, and a firmware memory 11c storing programs (firmware) for attaining the functions.

The reading unit 13 having an imaging device (e.g., a CCD) operates to read an image formed on an original and generates image data of the image. The recording unit 15 forms an image on a sheet (recording medium) based on print data. Specifically, if the main control unit 11 receives a print command from an external device via the USB host controller 25, the main control unit 11 controls the recording unit 15 to form an image based on print data sent by the external device on a sheet (printing function). If the main control unit 11 receives a read command from the external device, the main control unit 11 controls the reading unit 13 to read an image from an original placed on a platen glass of the reading unit 13 and to transmit image data corresponding to the read image to the external device via the USB host controller 25.

The modem 17 is connected to a PSTN (public switched telephone network) so as to enable the multifunction device 10 to transmit/receive facsimile data to/from an external facsimile device connected to the PSTN. The NVRAM 19 stores operation parameters defining operation of the multifunction device 10.

The display unit 21 includes an LCD (liquid crystal display) on which various types of information can be displayed. The operation unit 23 includes keys to be operated by a user. The operation unit 23 is also used to obtain information regarding user operation through use of the keys, and transmits information regarding the user operation to the main control unit 11.

In offices, devices which are not provided with a rich user interface are frequently used in a wireless communication environment. A representative example of a device having a relatively poor user interface is an image processing device (e.g., a printing device, an image scanner, or a digital multifunction device). It is understood that setup work for a wireless communication adapter connected to such a device is troublesome if the user needs to conduct the setup work through use of the relatively poor user interface.

The USB host controller 25 is an USB interface having a USB host controller. The USB host controller 25 functions as a USB host and operates to communicate with an USB device connected thereto by serial data transmission. As shown in FIG. 1, the USB host controller has the USB connectors 25a. By detecting change in voltage on a certain line in the USB interface, the USB host controller 25 detects that a device is connected to one of the USB connectors 25a. Further, the USB host controller 25 has a plug and play function. Based on the plug and play function, the USB host controller 25 operates in accordance with a USB program to obtain a descriptor containing information regarding a USB device (connected to the USB connector 25a) and to automatically adjust settings required for communication with the USB device.

In this aspect, the wireless communication adapter 30 and/or the storage device 50 can be connected to the USB connectors 25a. The wireless communication adapter 30 communicates with wireless communication apparatuses 5 through a wireless LAN 3.

Figure 2:
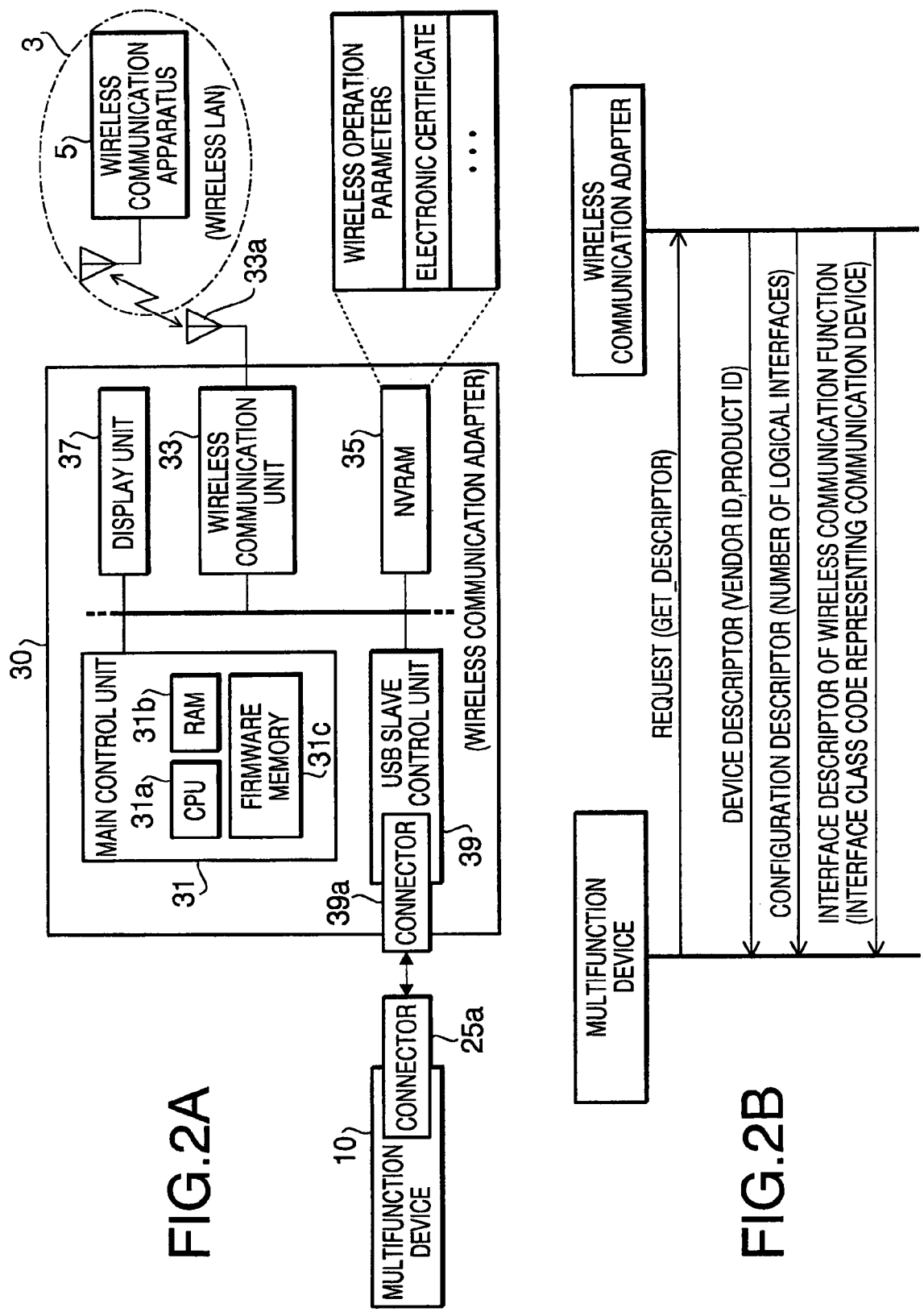
FIG. 2A shows a block diagram of a wireless communication adapter.
FIG. 2B illustrates data communication of descriptors between a multifunction device and the wireless communication adapter.

FIG. 2A shows a block diagram of the wireless communication adapter 30. In FIG. 2A, the multifunction device 10 and the wireless communication apparatus 5 are also shown.

As shown in FIG. 2A, the wireless communication adapter 30 includes a main control unit 31, a wireless communication unit 33, an NVRAM (non-volatile ram) 35, a display unit 37, and an USB slave control unit 39. The main control unit 31 includes a CPU (central processing unit) 31a which executes various types of programs, a RAM 31b used for a work memory for execution of the programs, and a firmware memory 31c in which programs functioning as firmware are stored.

In the firmware memory 31c, a print server program that causes the wireless communication adapter 30 to function as a print server, a scan server program that causes the wireless communication adapter 30 to function as a scan server, and a wireless communication program are stored. By the execution of the wireless communication program (i.e., a wireless communication task), the wireless communication unit 33 is controlled by the main control unit 31 so that the wireless communication adapter 30 provides a communication function of communicating with external devices in accordance with predetermined protocols via the wireless communication unit 33.

Specifically, the wireless communication unit 33 can be controlled by a wireless communication program (i.e., a wireless communication task) which is initiated when the wireless communication adapter 30 is turned ON. The wireless communication unit 33 operates to convert transmission data provided by the main control unit 31 to an RF (radio frequency) signal, and to transmit the RF signal via an antenna 33a to an external device (e.g., the wireless communication apparatus 5) through the wireless LAN 3. The wireless communication unit 33 also operates to receive an RF signal transmitted from the wireless communication apparatus 5 through the wireless LAN 3, to extract data superimposed on the received RF signal, and to provide the extracted data to the main control unit 31 as reception data.

In the NVRAM 35, parameters defining functions of the wireless communication task (including settings for the wireless communication unit 33) are stored. Hereafter, the parameters are referred to as wireless operation parameters. Further, in the NVRAM 35, an electronic certificate used for enhancing security in wireless communication is stored. The wireless operation parameters include a parameter defining a communication mode, a parameter defining a network identifier, a parameter defining an authentication and encryption scheme, and a parameter defining an encryption key.

More specifically, the communication mode includes an infrastructure mode in which communication is performed via an access point, and an ad hoc mode in which communication is performed without using an access point. For example, ESSID (Extended Service Set Identifier) represented by alphanumeric characters up to 32 characters may be used as the network identifier.

For example, one of open authentication, shared authentication, EAP-TLS (Extensible Authentication Protocol—Transport Layer Security) authentication requiring an electronic certificate may be used as the authentication scheme. For example, one of WEP (Wired Equivalent Privacy) and TKIP (Temporal Key Integrity Protocol) may be used as the encryption scheme.

The display unit 37 includes LEDs (light emitting diodes). On/Off states and colors of light of the LEDs in the display unit 37 are controlled so as to notify various types of information to a user. The USB slave control unit 39 functioning as a USB slave performs serial data communication with an USB device connected to a USB connector 39a.

When the USB connector 25a or one end of a cable (whose other end is connected to the USB connector 25a) is connected to the USB connector 39a, the USB slave control unit 39 operates to receive a request about a descriptor (Get_Descriptor) sent by the multifunction device 10, to generate descriptors representing its own device information, and to transmit the descriptors to the multifunction device 10.

FIG. 2B is an explanatory illustration of data communication of descriptors between the multifunction device 10 and the wireless communication adapter 30. As shown in FIG. 2B, when the USB slave control unit 38 of the wireless communication adapter 30 receives the request about the descriptor from the multifunction device 10, a device descriptor, a configuration descriptor, and an interface descriptor containing an interface class code representing a communication device are transmitted from the wireless communication adapter 30 to the multifunction device 10 under cooperation between the main control unit 31 and the USB slave control unit 39. In this case, the device descriptor includes a vendor ID and a product ID, and the configuration descriptor contain the number of logical interfaces.

By the data communication of the descriptors, the multifunction device 10 notices that the USB device connected thereto is a communication device defined by the received vendor ID and the product ID. Then, a logical interface for wireless communication is established between the wireless communication adapter 30 and the multifunction device 10, so that the multifunction device 10 can communicate with the external wireless communication apparatus 5 via the wireless communication adapter 30.

The printer server task or the scan server task executed by the main control unit 31 operates to communicate with the external wireless communication apparatus 5 via the wireless communication task and the wireless communication unit 33, and to communicate with the multifunction device 10 via the logical interface. The print server task running on the wireless communication adapter 30 allows the external wireless communication apparatus 5 to use the printing function of the multifunction device 10. Also, the scan server task running on the wireless communication adapter 10 allows the external wireless communication apparatus 5 to use the scanner function of the multifunction device 10.

More specifically, the main control unit 11 of the multifunction device 10 receives a printing command together with print data transmitted from the external wireless communication apparatus 5 via the print server task, and controls the recording unit 15 to form an image of the print data on a sheet.

Figure 3:
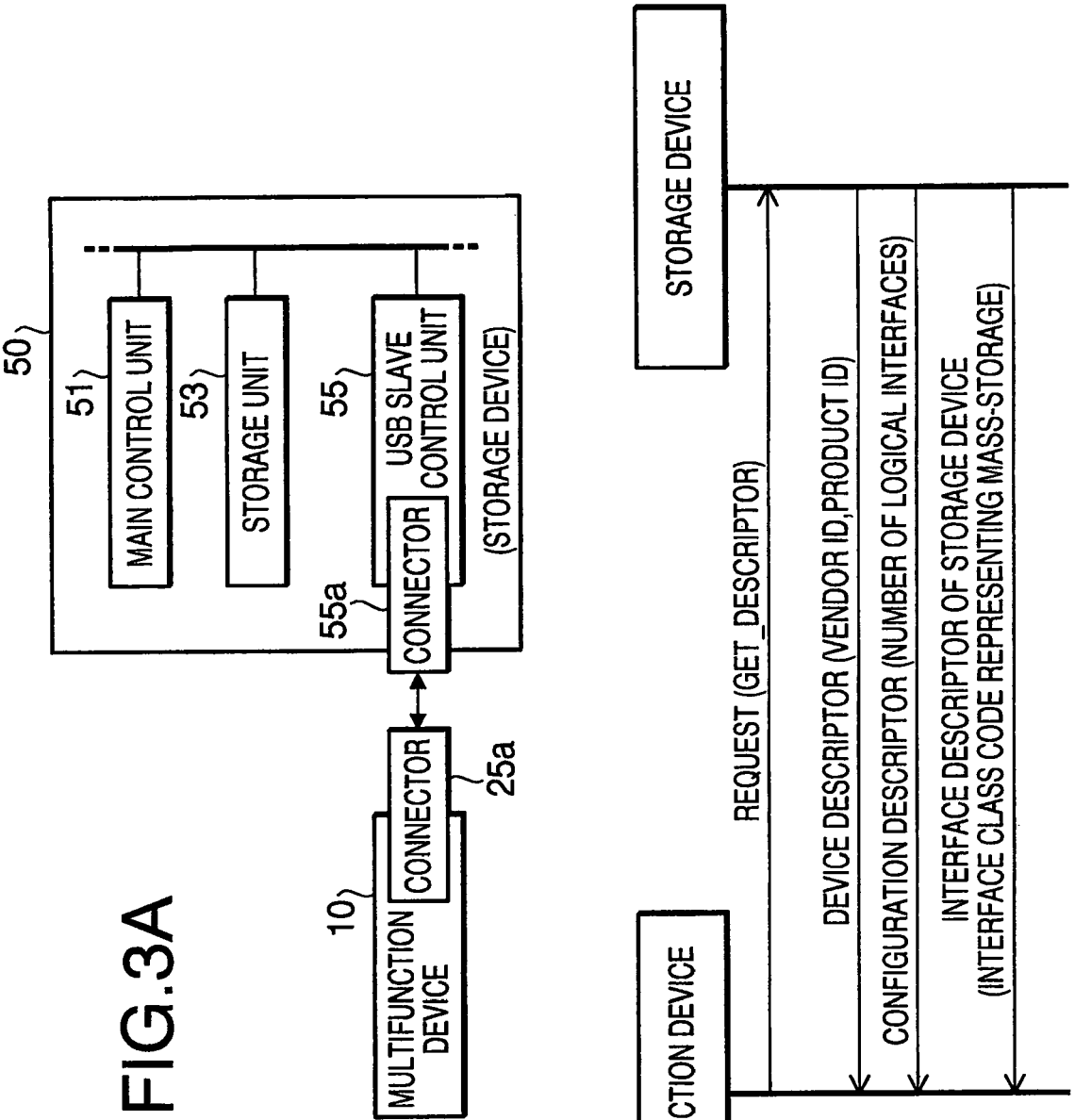
FIG. 3A shows a block diagram of a storage device.
FIG. 3B illustrates data communication of descriptors between the storage device and the multifunction device.

FIG. 3A shows a block diagram of the storage device 50. In FIG. 3A, the storage device 50 is connected to the USB connecter 57a of the multifunction device 10. The storage device 50 includes a main control unit 51 controlling various components in the device 50, a storage unit 53 including a non-volatile memory and a magnetic disk, a USB slave control unit 55 which causes the storage device 50 to operate as a USB slave device.

The USB slave control unit 55 includes a USB connector 55a. When the USB connector 25a or one end of a cable (whose other end is connected to the USB connector 25a) is connected to the USB connector 55a, the USB slave control unit 55 operates to receive a request about a descriptor (Get_Descriptor), to generate descriptors representing its own device information, and to transmit the descriptors to the multifunction device 10.

FIG. 3B is an explanatory illustration of data communication of descriptors between the storage device 50 and the multifunction device 10. As shown in FIG. 3B, if the USB slave control unit 55 of the storage device 50 receives the request about the descriptor from the multifunction device 10, a device descriptor, a configuration descriptor, and an interface descriptor are transmitted from the USB slave control unit 55 of the storage device 50 to the multifunction device 10 under cooperation between the main control unit 51 and the USB slave control unit 55. In this case, the device descriptor contains, for example, a vendor ID and a product ID, the configuration descriptor contains, for example, the number of logical interfaces, and the interface descriptor contains an interface class code representing a mass-storage.

By the data communication of the descriptors, a logical interface for transmission/reception of data stored in the storage unit 53 is established between the storage device 50 and the multifunction device 10. After the establishment of the logical interface, the main control unit 51 reads out data stored in the storage unit 53 in accordance with a control signal sent by the multifunction device 10, and transmits the data to the multifunction device 10.

Figure 4:
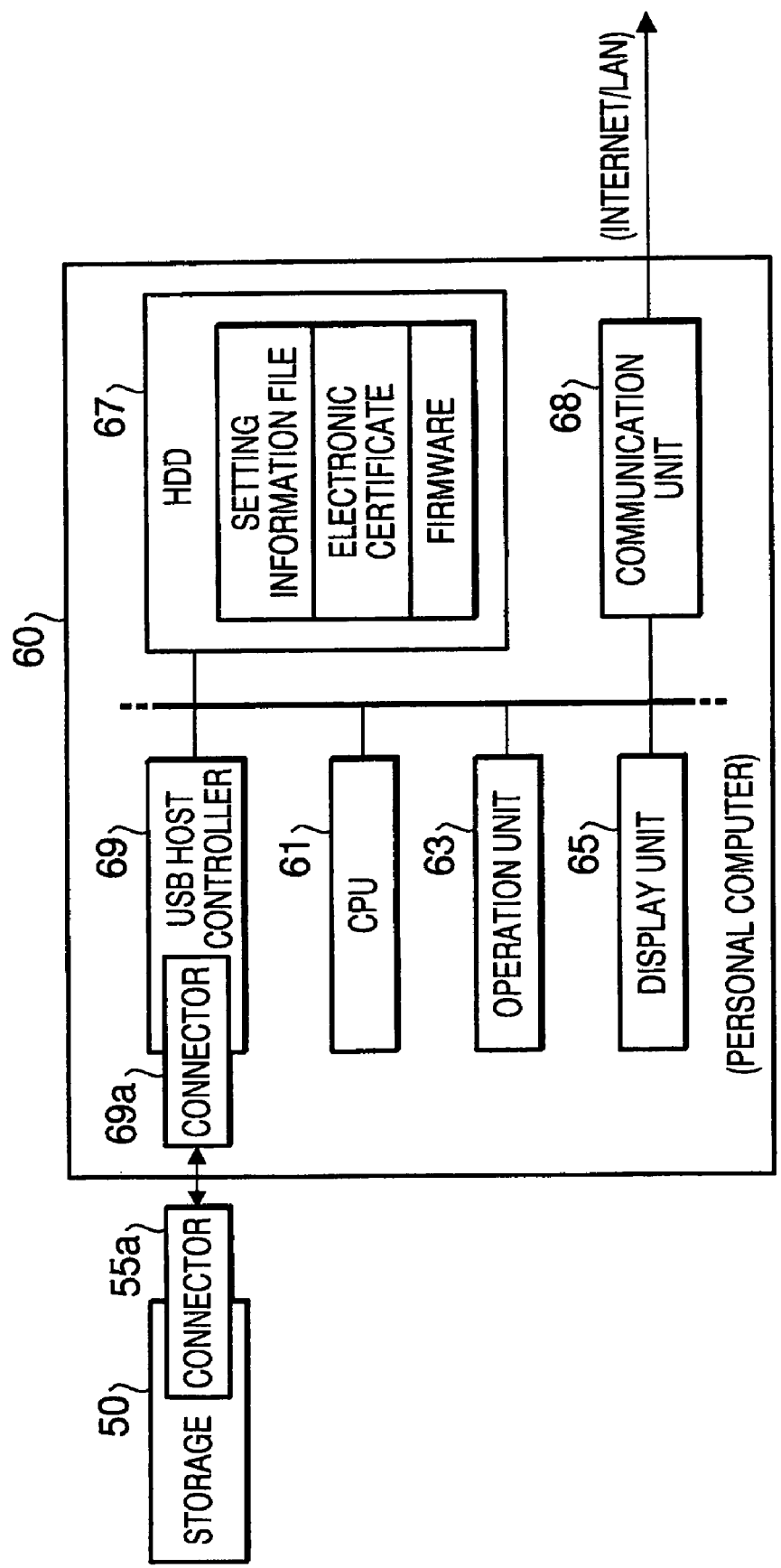
FIG. 4 shows a block diagram of a personal computer to which the storage device is connected.

FIG. 4 shows a block diagram of a PC (personal computer) 60. As shown in FIG. 4, the storage device 50 is configured to be connected to a USB connector 69a of the PC 60. When the storage device 50 is connected to the USB connector 69a of the PC 60, the storage device 50 adjusts its own settings so that descriptors can be sent to the PC 60 in accordance with a request about a descriptor sent by the PC 60, data stored in the storage unit 53 can be sent to the personal computer 60, and that data sent by the PC 60 can be stored in the storage unit 53. The descriptors transmitted from the storage device 50 to the PC 60 include a device descriptor and an interface descriptor containing an interface class code representing a mass-storage.

As described in detail later, setting information regarding the wireless operation parameters for the wireless communication adapter 30, an electronic certificate (which is required in security communication), and firmware for the wireless communication adapter 30 (and the multifunction device 10) are transmitted from the PC 60 to the storage device 50. By this configuration, applying the settings of the wireless operation parameters to the wireless communication adapter 30, import of the electronic certificate into wireless communication adapter 30, and update of the firmware for the wireless communication adapter 30 can be attained.

As shown in FIG. 4, the PC 60 includes a CPU 61 which executes various types of programs, an operation unit 63 including a keyboard and a pointing device, a display unit 65 (including, for example, a liquid crystal display), an HDD (hard disk drive) 67, a communication unit 68 for connecting the PC 60 to a wide area network (e.g., the Internet) and a USB host controller 69.

In the HDD 67 of the personal computer 60, a program for defining settings of the wireless communication adapter 30 is stored. By executing the program, the CPU 61 displays a setting screen on the display unit 65 so as to obtain the wireless operation parameters to be applied to the wireless communication adapter 30 from the user and to generate a setting information file defining values of the wireless operation parameters. The generated setting information file is stored in the HDD 67.

If a transmission command is inputted to the PC 60 by the user through use of the operation unit 63 in a situation where the storage device 50 is connected to the PC 60 via the USB connector 69a, the PC 60 controls the storage device 50 to transmit the setting information file in the HDD 67 to the storage unit 53 of the storage device 50.

If an acquisition command of an electronic certificate is inputted to the PC 60 by the user through use of the operation unit 63, the PC 60 operates to obtain an electronic certificate from an external authentication station via the communication unit 68 and to store the obtained electronic certificate into the HDD 67. If a transfer command of an electronic certificate is inputted to the PC 60 by the user through use of the operation unit 63, the PC 60 controls the storage device 50 so as to write the electronic certificate stored in the HDD 67 into the storage unit 53 of the storage device 50.

If an acquisition command of firmware is inputted to the PC 60 by the user through use of the operation unit 63, the PC 60 operates to obtain firmware of the wireless communication adapter 30 or firmware of the multifunction device 10 from an external server via the communication unit 68, and to store the obtained firmware into HDD 67. If a transfer command of firmware is inputted to the PC 60 by the user through use of the operation unit 63, the PC 60 controls the storage device 50 so as to write the firmware stored in the HDD 67 into the storage unit 53 of the storage device 50.

Consequently, the setting information file defining the wireless operation parameters to be applied to the wireless communication adapter 30, the electronic certificate used in a security communication in which the wireless communication adapter 30 is involved, and firmware for update is stored in the storage unit 53 of the storage device 50.

Figure 5:
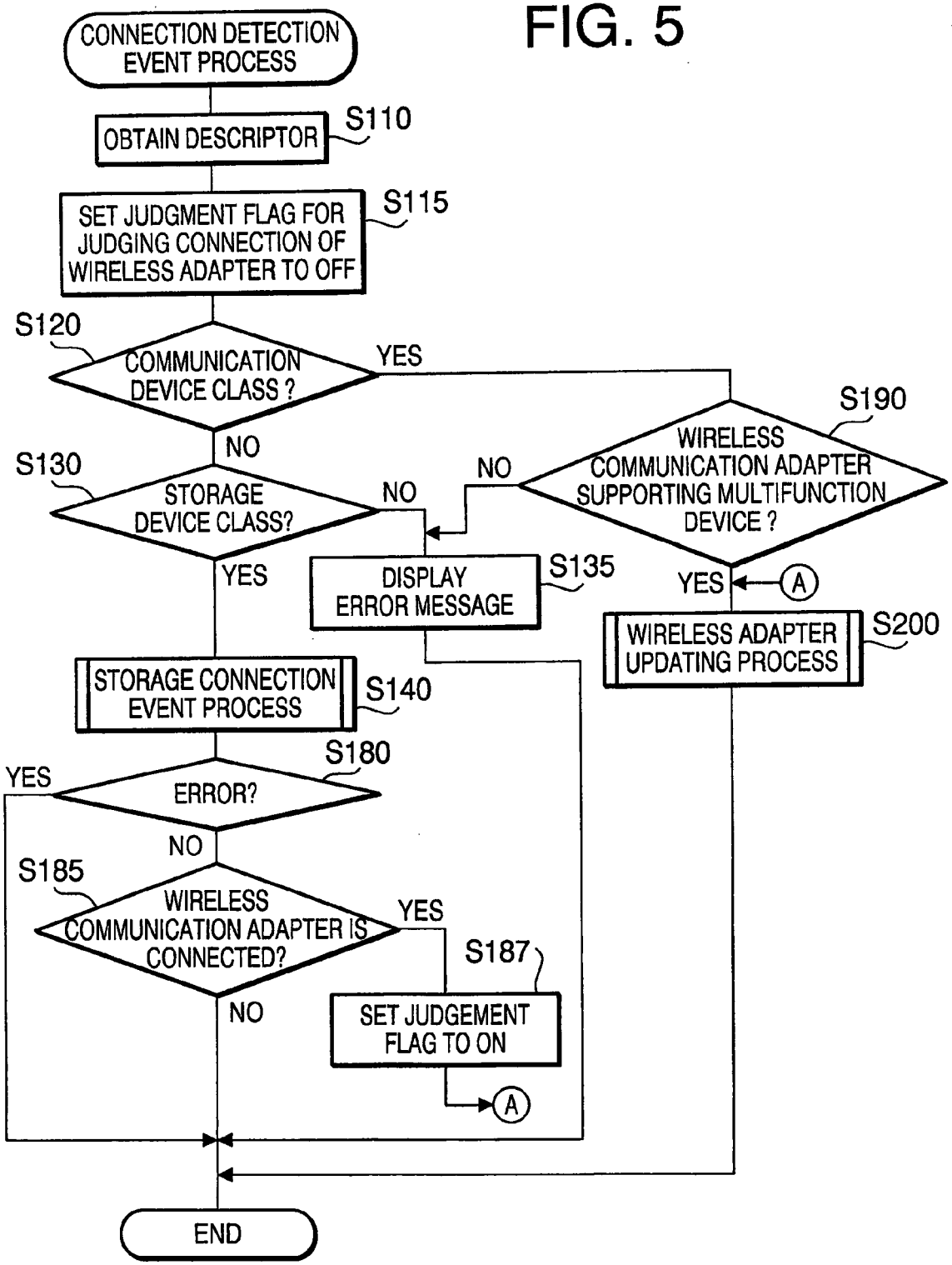
FIG. 5 is a flowchart illustrating a connection detection event process.

Hereafter, a connection detection event process executed under control of the main control unit 11 (i.e., the CPU 11a) of the multifunction device 10 is described. FIG. 5 is a flowchart illustrating the connection detection event process. The connection detection event process is initiated each time connection from a USB device to the USB connector 25a of the multifunction device 30 is detected by the CPU 11a, for example, when an interrupt request signal is inputted to the CPU 11a.

First, the main control unit 11 sends a request about a descriptor (i.e., "Get_Descriptor") to the USB device being connected to the USB connector 25a. Then, the main control unit 11 obtains descriptors including the device descriptor and the interface descriptor from the USB device (step S110). The descriptors are sent by the USB device as a response to the request.

Next, the main control unit 11 sets a judgment flag for judging connection of a wireless adapter to OFF (step S115). Then, the main control unit 11 judges whether the USB device being connected to the USB connector 25a is a communication class (step S120). Specifically, in step S120, the main control unit 11 judges whether an interface descriptor containing an interface class code representing a communication device is received. The main control unit 11 judges that the USB device being connected to the USB connector 25a is not a communication device if the interface descriptor containing an interface class code representing a communication device has not been received. The main control unit 11 judges that the USB device being connected to the USB connector 25a is a communication device if the interface descriptor containing an interface class code representing a communication device has been received.

If the judgment result in step S120 is "NO", the main control unit 11 judges whether the USB device being connected to the USB connector 25a is a storage device based on the descriptor obtained in step S110 (step S130). If both of the descriptors of the communication class and the storage class are obtained in step S110, the main control unit 11 may operate to judge that step S120 is NO. Specifically, in step S130, the main control unit 11 judges whether an interface descriptor containing an interface class code representing a mass-storage is received. The main control unit 11 judges that the USB device being connected to the USB connector 25a is not a storage device if the interface descriptor containing an interface class code representing a storage device has not been received. The main control unit 11 judges that the USB device being connected to the USB connector 25a is a storage device if the interface descriptor containing an interface class code representing a storage device has been received.

If the judgment result of step S130 is "NO", control proceeds to step S135 where the main control unit 11 notifies the user of the occurrence of an error through the display unit 21. Specifically, in step S130, a message representing that an USB device not supported by the multifunction device 10 is connected to the multifunction device 10 is displayed on the display unit 21. Then, the connection detection event process terminates.

Figure 6:
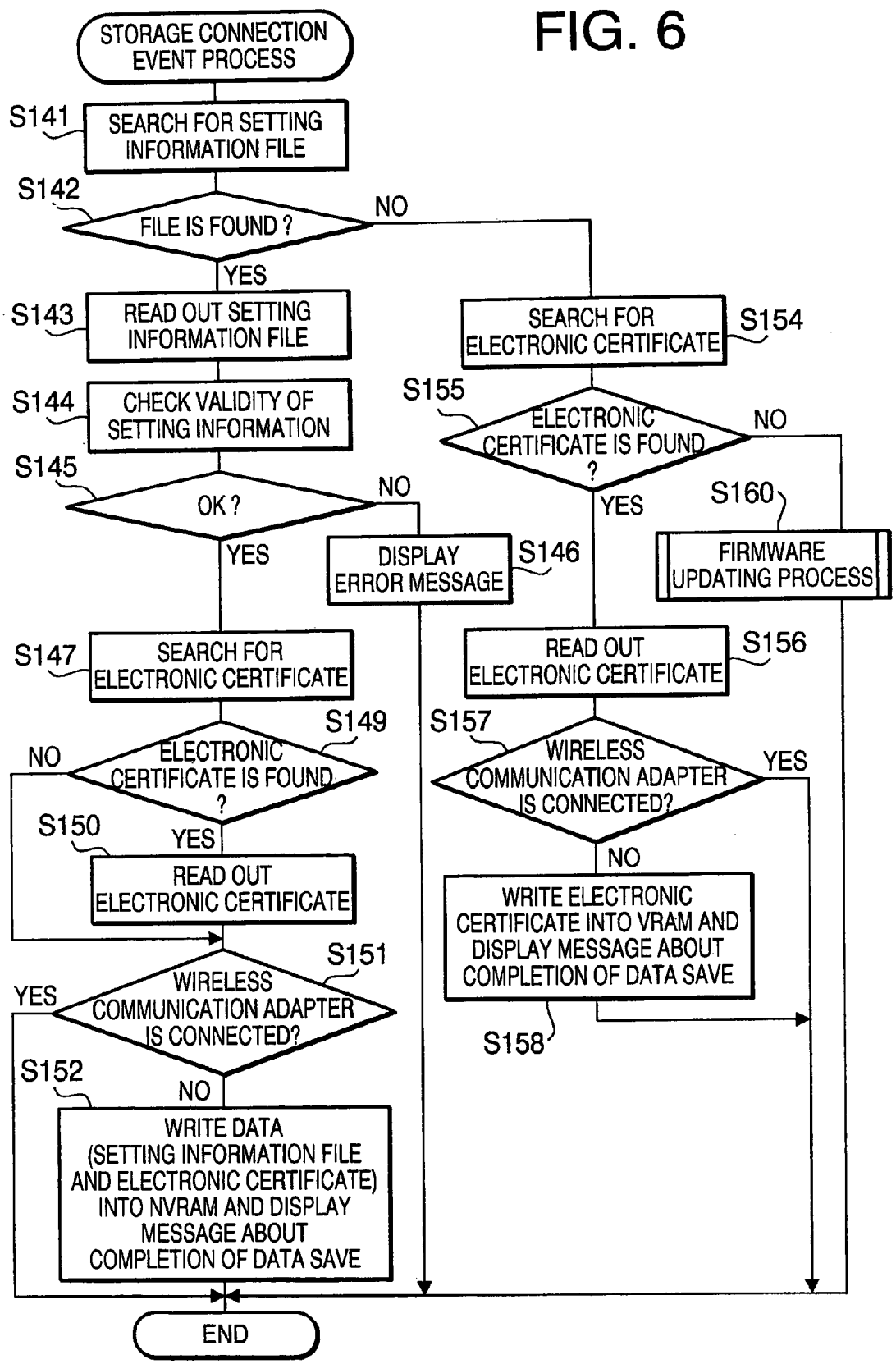
FIG. 6 is a flowchart illustrating a storage connection event process.

If the judgment result of step S130 is "YES", control proceeds to step S140 where a storage connection event process is executed. FIG. 6 is a flowchart illustrating the storage connection event process. As shown in FIG. 6, first, the main control unit 11 searches items of data stored in the storage unit 53 of the storage device 50 for a setting information file (S141). Specifically, the main control unit 11 searches for a file having a predetermined file name as a setting information file. Next, in step S142, the main control unit 11 judges whether the setting information file is stored in the storage unit 53.

If it is judged that the setting information file is stored in the storage unit 53 (S142: YES), the main control unit 11 controls the storage device 50 through the USB host controller 25 to read out the setting information file from the storage unit 53 of the storage device 50 (S143). Then, in step S144 the main control unit 11 checks validity of the setting information file obtained in step S143. Specifically, in step S144 the main control unit 11 checks whether a description of the setting information file matches a predetermined format.

Next, in step S145 the main control unit 11 judges whether the setting information has a problem regarding the validity. If the setting information file has a problem regarding the validity (S145: NO), the main control unit 11 displays error information through the display unit 21 (S146). For example, in step S146, a message indicating that a valid setting information file can not be obtained is displayed on the display unit 21. Then, the storage connection event process terminates.

After the storage connection event process is finished in a condition in which the judgment result of step S145 is "NO", the main control unit 11 judges that an error has occurred in step S180 of FIG. 5. Then, the connection detection event process terminates.

If the setting information file has no problem regarding the validity (S145: YES), the main control unit 11 searches the items of data stored in the storage unit 53 of the storage device 50 for an electronic certificate (S147). Then, the main control unit 11 judges whether the electronic certificate is stored in the storage unit 53 (S149).

If the electronic certificate is stored in the storage unit 53 (S149: YES), the main control unit 11 controls the storage device 50 via the USB host controller 25 to read out the electronic certificate from the storage unit 53 of the storage device 50 (S150). Then, control proceeds to step S151. If it is judged in step S149 that the electronic certificate is not stored in the storage unit 53 (S149: NO), control proceeds to step S151 without executing step S150.

In step S151, the main control unit 11 judges whether the wireless communication adapter 30 which is one of particular devices that the multifunction device 10 supports is connected to the USB connector 25a. In step S151, the main control unit 11 judges that the wireless communication adapter 30 is connected to the USB connector 25a if the multifunction device 10 has already obtained the descriptor from the wireless communication adapter in step S110. The main control unit 11 judges in step S151 that the wireless communication adapter 30 is not connected to the USB connector 25a if the multifunction device 10 has not detected the wireless communication adapter 30 in step S110.

If the judgment result of step S151 is "NO", the main control unit 11 stores the setting information obtained in step S143 from the storage device 50 and the electronic certificate into the NVRAM 19 (S152). Further, in step S152, the main control unit 11 displays a message indicating that the data save operation is completed on the display unit 21. Then, the storage connection event process terminates. If the judgment result of step S151 is "YES", the connection detection event process terminates without executing step S152.

If the storage connection event process is finished after undergoing step S151 or step S152, the main control unit 11 judges that an error has not occurred in step S180 (see FIG. 5). Then, the main control unit 11 judges whether the wireless communication adapter 30 has been connected to the USB connector 25a. Specifically, in step S185, the main control unit judges that the wireless communication adapter has been connected to the USB connector 25a if the judgment result of step S151 is "YES". The main control unit 11 judges in step S185 that the wireless communication adapter 30 has not been connected to the USB connector 25a if the judgment result of step S151 is "NO".

If the judgment result of step S185 is "NO", the connection detection event process terminates. If the judgment result of step S185 is "YES", control proceeds to step S187 where the main control unit 11 sets the judgment flag for judging connection of a wireless adapter to ON. Then, control proceeds to step S200 to execute a wireless adapter updating process.

If it is judged that the setting information file is not stored in the storage unit 53 (S142: NO), control proceeds to step S154. In step S154, the main control unit 11 searches the items of data stored in the storage unit 53 of the storage device 50 for the electronic certificate. Then, the main control unit 11 judges whether the electronic certificate is stored in the storage unit 53 (S155).

If the electronic certificate is stored in the storage unit 53 (S155: YES), the main control unit 11 controls the storage device 50 via the USB host controller 25 to read out the electronic certificate from the storage unit 53 of the storage device 50 (S156). In step S157, similarly to step S151, the main control unit 11 judges whether the wireless communication adapter 30 which is one of particular devices that the multifunction device 10 supports is connected to the USB connector 25a.

If the judgment result of step S157 is "NO", control proceeds to step S158. In step S158, the main control unit 11 stores the electronic certificate obtained in step S156 from the storage device 50 into the NVRAM 19. Further, in step S158, the main control unit 11 displays a message indicating that the data save operation is completed on the display unit 21. Then, the storage connection event process terminates. If the judgment result of step S157 is "YES", the connection detection event process terminates without executing step S158.

If the storage connection event process is finished after undergoing step S157 or step S158, the main control unit 11 judges that an error has not occurred in step S180 (see FIG. 5). Then, the main control unit 11 judges whether the wireless communication adapter 30 has been connected to the USB connector 25a. Specifically, in step S185, the main control unit judges that the wireless communication adapter has been connected to the USB connector 25a if the judgment result of step S157 is "YES". The main control unit 11 judges in step S185 that the wireless communication adapter 30 has not been connected to the USB connector 25a if the judgment result of step S157 is "NO".

Figure 7:
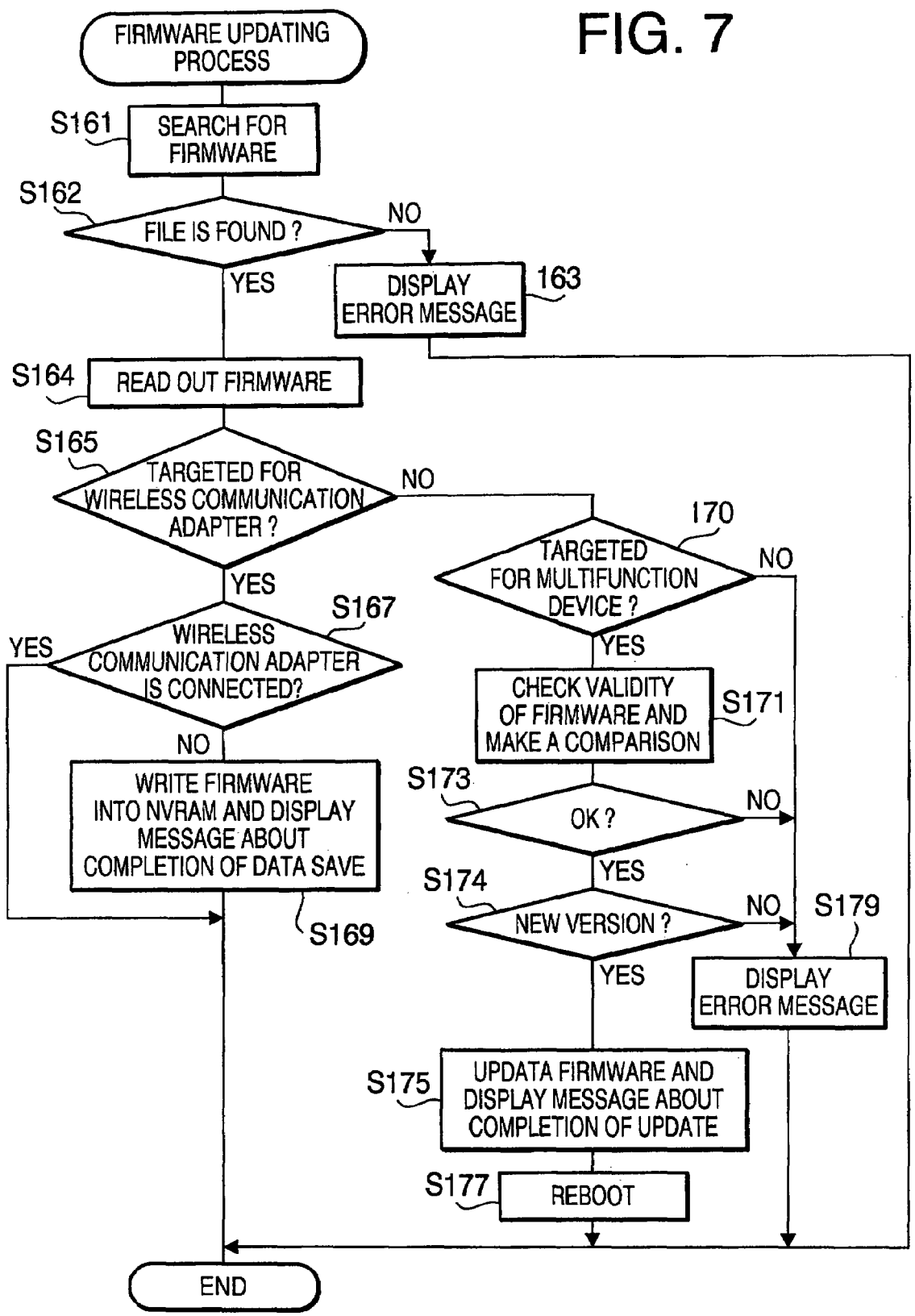
FIG. 7 is a flowchart illustrating a firmware updating process.

If it is judged in step S155 that the electronic certificate is not stored in the storage unit 53 of the storage device 50 (S155: NO), control proceeds to step S160. In step S160, a firmware updating process is executed. FIG. 7 is a flowchart illustrating the firmware updating process.

First, the main control unit 11 searches the items of data stored in the storage unit 53 of the storage device 50 for firmware (S161). Then, the main control unit 11 judges whether the firmware is registered in the storage unit 53 (S162). Specifically, in step S162, the main control unit 11 searches for a file having a predetermined filename used as firmware.

If the firmware is not registered in the storage unit 53 (S162: NO), control proceeds to step S163 where the main control unit 11 displays a message indicating that the firmware is not registered in the storage unit 53. Then, the firmware updating process terminates. After step S162 is processed, control returns to step S180 and the main control unit 11 judges that an error has occurred (S180: YES). Then, the connection detection event process terminates.

If it is judged in step S162 that the firmware is registered in the storage unit 53 (S162: YES), control proceeds to step S164. In step S164, the main control unit 11 reads out the firmware from the storage unit 53 of the storage device 50 via the USB host controller 25. Next, the main control unit 11 judges whether the firmware obtained in step S164 is targeted for the wireless communication adapter 30 based on a filename of the firmware.

If the firmware is targeted for the wireless communication adapter 30 (S165: YES), control proceeds to step S167. In step S167, similarly to step S151, the main control unit 11 judges whether the wireless communication adapter 30 has been connected to the USB connector 25a. If the judgment result of step S167 is "NO", control proceeds to step S169. In step S169, the main control unit 11 stores the firmware obtained in step S164 from the storage device 50 into the NVRAM 19. Further, in step S169, the main control unit 11 displays a message indicating that the data save operation is completed on the display unit 21. Then, the firmware updating process terminates.

If the firmware updating process terminates after undergoing step S167 or step S169, the judgment result of step S180 becomes "NO". Then, the main control unit 11 judges whether the wireless communication adapter 30 has been connected to the USB connector 25a. Specifically, in step S185, the main control unit judges that the wireless communication adapter 30 has been connected to the USB connector 25a if the judgment result of step S167 is "YES". The main control unit 11 judges in step S185 that the wireless communication adapter 30 has not been connected to the USB connector 25a if the judgment result of step S167 is "NO".

If the judgment result of step S185 is "NO", the connection detection event process terminates. If the judgment result of step S185 is "YES", control proceeds to step S187 where the main control unit 11 sets the judgment flag for judging connection of a wireless adapter to ON. Then, control proceeds to step S200 to execute the wireless adapter updating process.

If it is judged n step S165 that the firmware is not targeted for the wireless communication adapter 30 (S165: NO), control proceeds to step S170. In step S170, the main control unit 11 judges whether the firmware obtained in step S164 is targeted for the multifunction device 10. If the firmware is not targeted for the multifunction device 10 (S170: NO), control proceeds to step S179.

If the firmware is targeted for the multifunction device 10 (S170: YES), control proceeds to step S171. In step S171, the main control unit 11 checks the validity of the firmware. Specifically, in step S171, the main control unit 11 analyzes a header of the firmware to check whether the filename and a body part of the firmware are appropriate as firmware for the multifunction device 10. In step S171, a version of the firmware defined in the header is also read from the firmware, and the version of the obtained firmware is compared with a version of the current firmware of the multifunction device 10.

Next, in step S173, the main control unit 11 checks whether the obtained firmware is valid. If the obtained firmware is not valid (S173: NO), control proceeds to step S179. If the obtained firmware is valid (S173: YES), control proceeds to step S174 where the main control unit 11 judges whether the version of the firmware obtained in step S164 is newer than that of the current firmware of the multifunction device 10.

If the version of the firmware obtained in step S164 is newer than that of the current firmware of the multifunction device 10 (S174: YES), a firmware update is performed (S175). Further, in step S175, after the firmware update is finished, the main control unit 11 displays a message indicating that the firmware update is finished on the display unit 21. Then, control proceeds to step S177 where the multifunction device 10 is rebooted.

If the version of the firmware obtained in step S164 is not newer than that of the current firmware of the multifunction device 10 (S174: NO), control proceeds to step S179. In step S179, the main control unit 11 displays a message indicating that the firmware is not the latest version or the firmware is invalid. Then, the firmware updating process and the storage connection event process terminate, and thereafter control proceeds to step S180 of FIG. 5. In this case, the judgment result of step S180 is "YES". Then, the connection detection event process terminates.

Referring now to FIG. 5, if it is judged in step S120 that the USB device connected to the USB connector 25a is the communication device class, control proceeds to step S190. In step S190, the main control unit 11 judges whether the USB device connected to the USB connector 25a is a wireless communication adapter supporting the multifunction device 30. The term "wireless communication adapter supporting the multifunction device 30" means an adapter which is capable of setting up wireless operation parameters defining a wireless communication operation responsive to a command signal which is generated by the multifunction device 10 based on the setting information file provided by the storage device 50.

In step S190, the main control unit 11 checks whether the USB device is the wireless communication adapter supporting the multifunction device 10 based on a vendor ID (a vendor identification of the adapter) and a product ID (a product identification of the adapter) contained in the device descriptor.

If it is judged in step S190 that the USB device is not the wireless communication adapter supporting the multifunction device 10, control proceeds to step S135 to display the error information. Then, the connection detection event process terminates.

If it is judged in step S190 that the USB device is the wireless communication adapter (i.e., the wireless communication adapter 30) supporting the multifunction device 10, control proceeds to step S200 where a wireless adapter updating process is executed.

Figure 8:
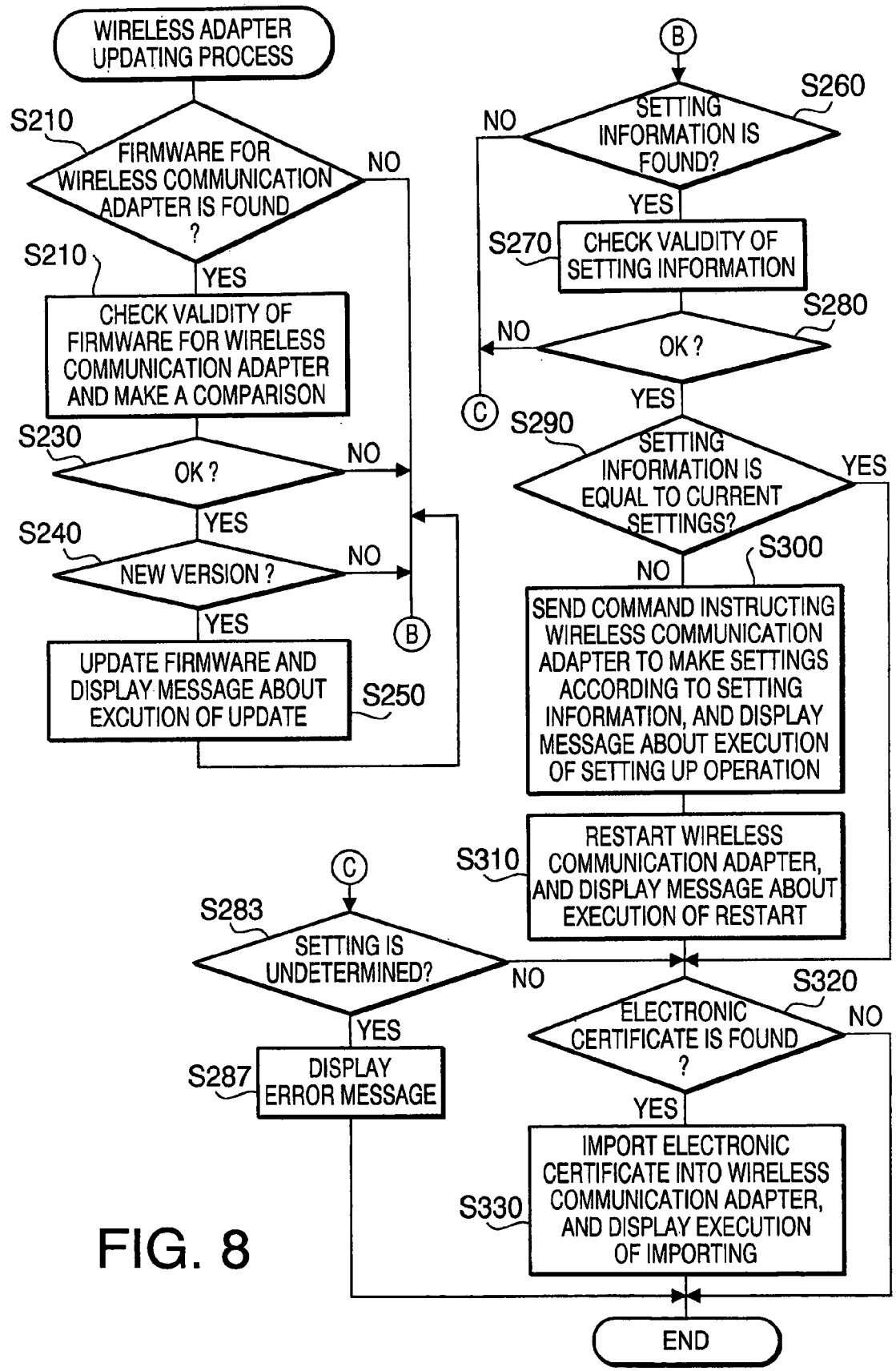
FIG. 8 is a flowchart illustrating a wireless adapter updating process.

FIG. 8 is a flowchart illustrating the wireless adapter updating process. As shown in FIG. 8, the main control unit 11 judges whether firmware for the wireless communication adapter 30 exists in the NVRAM 19 or in the storage device 50 connected to the USB connector 25a. Specifically, if the judgment flag is OFF and the firmware for the wireless communication adapter 30 is stored in the NVRAM 19 or if the judgment flag is ON and the firmware for the wireless communication adapter 30 is stored in the storage device 50 connected to the USB connector 25a, then the judgment result of step S210 is "YES". If these conditions are not satisfied, the judgment result of step S210 is "NO".

If the judgment result of step S210 is "NO", control proceeds to step S260. If the judgment result of step S210 is "YES", control proceeds to step S220. In step S220, the main control unit 11 checks the validity of target firmware stored in the NVRAM 19 or in the storage device 50. Specifically, in step S220, the main control unit 11 analyzes a header of the firmware to check the file name and a body part of the firmware are appropriate as firmware for the wireless communication adapter 30. In step S220, a version of the firmware defined in the header is also read from the firmware, and the version of the firmware is compared with a version of the current firmware of the wireless communication adapter 30.

Next, in step S230, the main control unit 11 checks whether the target firmware is valid. If the target firmware is not valid (S230: NO), control proceeds to step S260. If the target firmware is valid (S230: YES), control proceeds to step S240 where the main control unit 11 judges whether the version of the target firmware is newer than that of the current firmware stored in the firmware memory 31c of the wireless communication adapter 30.

If the version of the target firmware is newer than that of the current firmware of the wireless communication adapter 30 (S240: YES), a firmware update is performed (S250). Specifically, in step S250, the main control unit 11 of the multifunction device 10 sends the target firmware along with an update command signal instructing the updating of firmware to the wireless communication adapter 30 via the USB host controller 25 so as to cause the main control unit 31 of the wireless communication adapter 30 to execute the updating of firmware. Further, in step S250, the main control unit 11 displays a message indicating that the firmware update is running on the display unit 21.

After the firmware update is finished, if the firmware is stored in the NVRAM 19, the firmware in the NVRAM 19 may or may not be deleted. After step S250 is finished, control proceeds to step S260.

In step S260, the main control unit 11 judges whether the setting information file is stored in the NVRAM 19 or in the storage device 50 connected to the USB connector 25a. Specifically, if the judgment flag is OFF and the setting information file is stored in the NVRAM 19 or if the judgment flag is ON and the setting information file is stored in the storage device 50 connected to the USB connector 25a, then the judgment result of step S260 is "YES". If these conditions are not satisfied, the judgment result of step S260 is "NO".

If the judgment result of step S260 is "YES", control proceeds to step S270 where the main control unit 11 checks the validity of the target setting information file stored in the NVBRAM 19 or in the storage device 50. Specifically, in step S270, the main control unit 11 judges whether a header and description in the target setting information file meet predetermined specifications.

After the validity check of step S270 is finished, control proceeds to step S280 where the main control unit 11 judges whether the target setting information file is valid. If the target setting information file is invalid (S280: NO), control proceeds to step S283. If the target setting information file is valid (S280: YES), control proceeds to step S290.

In step S290, the main control unit 11 judges whether parameters contained in the target setting information file stored in the NVRAM 19 or in the storage device 50 are equal to the current wireless operation parameters currently applied to the wireless communication adapter 30 so as to judge whether the parameters contained in the target setting information file have already been applied to the wireless communication adapter 30.

If the parameters in the target setting information file are equal to the current wireless operation parameters (S290: YES), control proceeds to step S320. If the parameters in the target setting information file are not equal to the current wireless operation parameters (S290: NO), control proceeds to step S300.

In step S300, the main control unit 11 analyzes the target setting information file stored in the NVRAM 19 or in the storage device 50 and generates a setting command signal instructing the wireless communication adapter 30 to apply the setting information file to the wireless operation parameters. After the setting command signal is sent from the multifunction device 10 to the wireless communication adapter 30 via the USB host controller 25, the wireless communication adapter 30 sets up the wireless operation parameters according to the setting command signal. The main control unit 11 displays a message indicating that the set up operation is running (or a state of the set up operation) while the main control unit 11 is sending the setting command signal.

Next, in step S310, the main control unit 11 sends a restart command signal instructing the wireless communication adapter 30 to restart a wireless communication task to the wireless communication adapter 30. Further, in step S310, the main control unit 111 displays a message indicating start of the wireless communication task. After the set up operation is finished, the setting information file stored in the NVRAM 19 may or may not be deleted. Then, control proceeds to step S320.

If the judgment result of step S260 is "NO", control proceeds to step S283 where the main control unit 11 communicates with the wireless communication adapter 30 so as to judge whether the wireless operation parameters of the wireless communication adapter 30 stay undetermined (i.e., the operation parameters have not been changed from default settings). If it is judged in step S283 that the wireless operation parameters stay undetermined (S283: YES), control proceeds to step S287 where the main control unit 11 displays a message indicating that the wireless operation parameters stay undetermined on the display unit 21. Then, the wireless adapter updating process terminates. If it is judged in step S283 that the wireless operation parameters do not stay undetermined (S283: NO), control proceeds to step S320.

In step S320, the main control unit judges whether an electronic certificate exists in the NVRAM 19 or in the storage device 50 connected to the USB connector 25a. Specifically, in step S320, if the judgment flag is OFF and the electronic certificate is stored in the NVRAM 19 or if the judgment flag is ON and the electronic certificate is stored in the storage device 50 connected to the USB connector 25a, the judgment result is "YES". If these conditions are not satisfied, the judgment result of step S320 is "NO".

If the judgment result of step S320 is "YES", the main control unit 11 sends an import command signal instructing the wireless communication adapter 30 to import the electronic certificate, together with the electronic certificate (S330). Further, the message about the execution of importing is displayed in step S330. After step S330 is finished, the wireless adapter updating process terminates. Then, the connection detection event process of FIG. 5 terminates. After the import of the electronic certificate is finished, the electronic certificate stored in the NVRAM 19 may or may not be deleted.

If the judgment result of step S320 is "NO", the wireless adapter updating process terminates. Then, the connection detection event process terminates.

Figure 9:
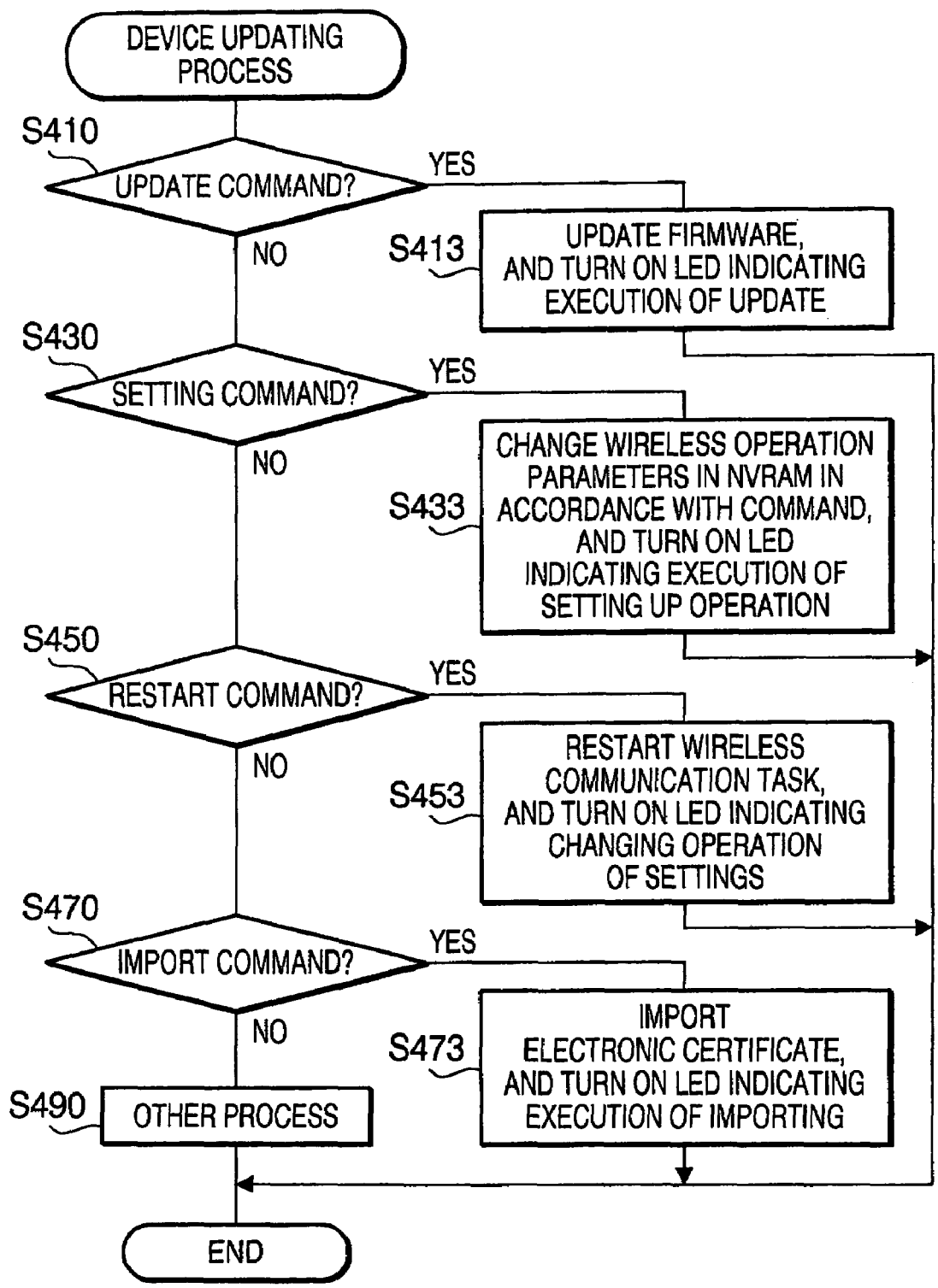
FIG. 9 is a flowchart illustrating a device updating process.

Hereafter, a device updating process executed by the main control unit 31 of the wireless communication adapter 30 will be described. FIG. 9 is a flowchart illustrating the device updating process. The device updating process is initiated when one of the commands generated by the multifunction device 10 in the connection detection event process is received by the main control unit 31 of the wireless communication adapter 30.

First, the main control unit 31 judges whether the command sent from the multifunction device 30 is the update command instructing the updating of firmware (S410). If the command sent from the multifunction device 30 is the update command (S410: YES), control proceeds to step S413. In step S413, the main control unit 13 updates the firmware stored in the firmware memory 31c by using the firmware provided together with the update command by the multifunction device 10. Further, in step S413, the main control unit 13 notifies a user that the firmware update is running via the display unit 37, for example, by turning on a LED of the display unit 37 having a particular color used to indicate the execution of firmware update. Then, the device updating process terminates.

If the command sent from the multifunction device 30 is not the update command (S410: NO), control proceeds to step S430. In step S430, the main control unit 13 judges whether the command provided by the multifunction device 30 is the setting command. If the command provided by the multifunction device 30 is the setting command (S430: YES), control proceeds to step S433. In step S433, the main control unit 13 updates the wireless operation parameters stored in the NVRAM 35 in accordance with the received setting command signal. Further, in step S433, the main control unit 13 notifies a user that the set up operation is running via the display unit 37, for example, by turning on a LED of the display unit 37 having a particular color used to indicate the execution of the set up operation. Then, the device updating process terminates.

If the command provided by the multifunction device 30 is not the setting command (S430: NO), control proceeds to step S450. In S450, the main control unit 13 judges whether the command provided by the multifunction device 30 is the restart command. If the command provided by the multifunction device 30 is the restart command (S450: YES), control proceeds to step S453.

In step S453, the main control unit 13 restarts the wireless communication task so as to apply the wireless operation parameters updated in step S433 to the wireless communication operation. Further, in step S453, the main control unit 13 notifies a user that the changing operation of settings is running via the display unit 37, for example, by turning on a LED of the display unit 37 having a particular color used to indicate the execution of the changing operation of settings. Then, the device updating process terminates.

If it is judged in step S450 that the command provided by the multifunction device 30 is not the restart command (S450:

NO), control proceeds to step S470. In step S470, the main control unit 13 judges whether the command provided by the multifunction device 30 is the import command. If the command provided by the multifunction device 30 is the import command (S470: YES), control proceeds to step S473.

In step S473, the main control unit 31 stores the electronic certificate, which is provided along with the import command by the multifunction device 10, in a predetermined memory area for an electronic certificate in the NVRAM 35 to complete the import of the electronic certificate. Further, in step S473, the main control unit 13 notifies a user that the import operation is running via the display unit 37. Then, the device updating process terminates.

If it is judged in step S470 that the command provided by the multifunction device 30 is not the import command (S470: NO), control proceeds to step S490 where the main control unit 31 executes other processes for another command. Then, the device updating process terminates.

As described above, the multifunction device 10 judges whether the storage device 50 is connected to the multifunction device via the USB interface (S130). If the storage device 50 is connected to the multifunction device 10, the multifunction device 10 further judges whether the setting information file is stored in the storage device 50 (S141, S142). If the setting information file is stored in the storage device 50, the multifunction device 50 obtains the setting information file from the storage device 50 (S143).

On the other hand, in the connection detection event process, the multifunction device 10 judges whether the wireless communication adapter 30 is connected to the multifunction device 10 (S120, S190). If the wireless communication adapter 30 is connected to the multifunction device 10, the multifunction device 10 sends the setting command to the wireless communication adapter 30 so as to configure the wireless communication operation of the wireless communication adapter (S300). After receiving the setting command, the wireless communication adapter 30 sets up the wireless communication operation, i.e., sets up the wireless operation parameters (S433).

Therefore, according to aspects, by connecting the storage device 50 to the multifunction device 10 first, subsequently removing the storage device 50 from the multifunction device 10, and then connecting the wireless communication adapter 30 to the multifunction device 10 in place of the storage device 50, the setting information stored in the storage device 50 can be applied to the wireless communication operation of the wireless communication adapter 30 so that the wireless communication adapter 30 operates in accordance with the setting information which was originally stored in the storage device 50.

Since the multifunction device 10 has USB connectors (25a), it is also possible to apply the setting information stored in the storage device 50 to the wireless communication operation of the wireless communication adapter 30 in a situation where both of the storage device 50 and the wireless communication adapter 30 are connected to the multifunction device 10.

According to these aspects, a user is not required to operate the multifunction device 10 to apply the setting information to the wireless communication adapter 30. In other words, the user can apply the setting information to the wireless communication adapter 30 without operating the multifunction device 10 whose user interface is poor. It should be noted that, according to some aspects, the operation to be performed to apply the setting information to the wireless communication adapter is simple. The user is only required to operate the personal computer 60 to store the setting information file to the storage device 50 and then to connect the storage device 50 and the wireless communication adapter 30 to the multifunction device 10. That is, according to some aspects, a setup operation for setting up the wireless communication function of the multifunction device 10 becomes easy.

Since the wireless communication adapter 30 has the function of the print server task, it is possible to cause the wireless communication adapter 30 to operate as the print server by simply connecting the wireless communication adapter 30 to the multifunction device 10.

In the wireless communication system 1, the USB interface is adapted as a general-purpose interface for the connection between the devices, and the multifunction device 10 has the USB host controller. Therefore, the wireless communication adapter 30 is not required to have the USB host controller, by which the manufacturing cost of the wireless communication adapter 30 can be reduced.

Since in general a storage device like the storage device 50 is configured as a slave device operating under control of a master device, it is possible to use a generally used storage device as the storage device 50. It is not required to use a special-purpose storage device as the storage device 50.

In these aspects, if it is judged that the wireless communication adapter 30 is connected to the multifunction device 10, the setting information file obtained from the storage device 50 is compared with the current settings of the wireless communication adapter 30 (S290). If the setting information file obtained from the storage device 50 is equal to the current settings of the wireless communication adapter 30, the setting information file is not applied to the wireless communication adapter 30 (S290). The setting information file is applied to the wireless communication adapter 30 only when the setting information file obtained from the storage device 50 is not equal to the current settings of the wireless communication adapter 30 (S290, S300).

Therefore, according to some aspects, it is possible to prevent an unnecessary setting operation from being performed when the setting information file obtained from the storage device 50 is equal to the current settings of the wireless communication adapter 30.

It should be noted that the above mentioned advantages may be realized in a situation where multifunction devices are provided in a system and a user sets up the multifunction devices one by one.

In some aspects, the information representing a state of the set up operation is given to the user while the wireless communication adapter 30 is executing the set up operation (S300, S310, S433, S453). Therefore, conditions of the set up operation are securely notified to the user.

In some aspects, if the storage device 30 is connected to the multifunction device 10, the multifunction device 10 judges whether the electronic certificate to be used in the security communication is stored in the storage device (S147, S149, S154, S155). If it is judged that the electronic certificate is stored in the storage device 50, the multifunction device 30 obtains the electronic certificate from the storage device 50 (S150, S156), and sends the electronic certificate to the wireless communication adapter 30 so that the wireless communication adapter 30 can import the electronic certificate (S330).

According to certain aspects, the import of the electronic certificate is also attained by using the storage device 50.

In some aspects, if it is judged that the storage device 50 is connected to the multifunction device 10, the multifunction device 10 judges whether the firmware of the wireless communication adapter 30 is stored in the storage device 50 (S162, S165). If the firmware of the wireless communication adapter 30 is stored in the storage device 50, the multifunction device 10 obtains the firmware from the storage device 50, and sends the firmware to the wireless communication adapter 30 so that the wireless communication adapter 30 can update the firmware.

Therefore, according to certain aspects, the update of firmware as well as the setting up of the wireless operation parameters are attained by using the storage device 50.

Although the present invention has been described in considerable detail with reference to certain aspects thereof, other aspects exist.

In some of the aspects described above, the multifunction device 30 operates to analyze the setting information file and to generate the command signal used to instruct the wireless communication adapter 30 to configure the wireless communication operation. However, the multifunction device 10 may be configured only to transfer the setting information file obtained from the storage device 50 to the wireless communication adapter 30. In this case, the wireless communication adapter 30 operates to analyze the setting information file forwarded by the multifunction device 10 and to configure the wireless communication operation in accordance with the setting information file. Such a variation of these aspects may be accomplished as follows.

Figure 10A:
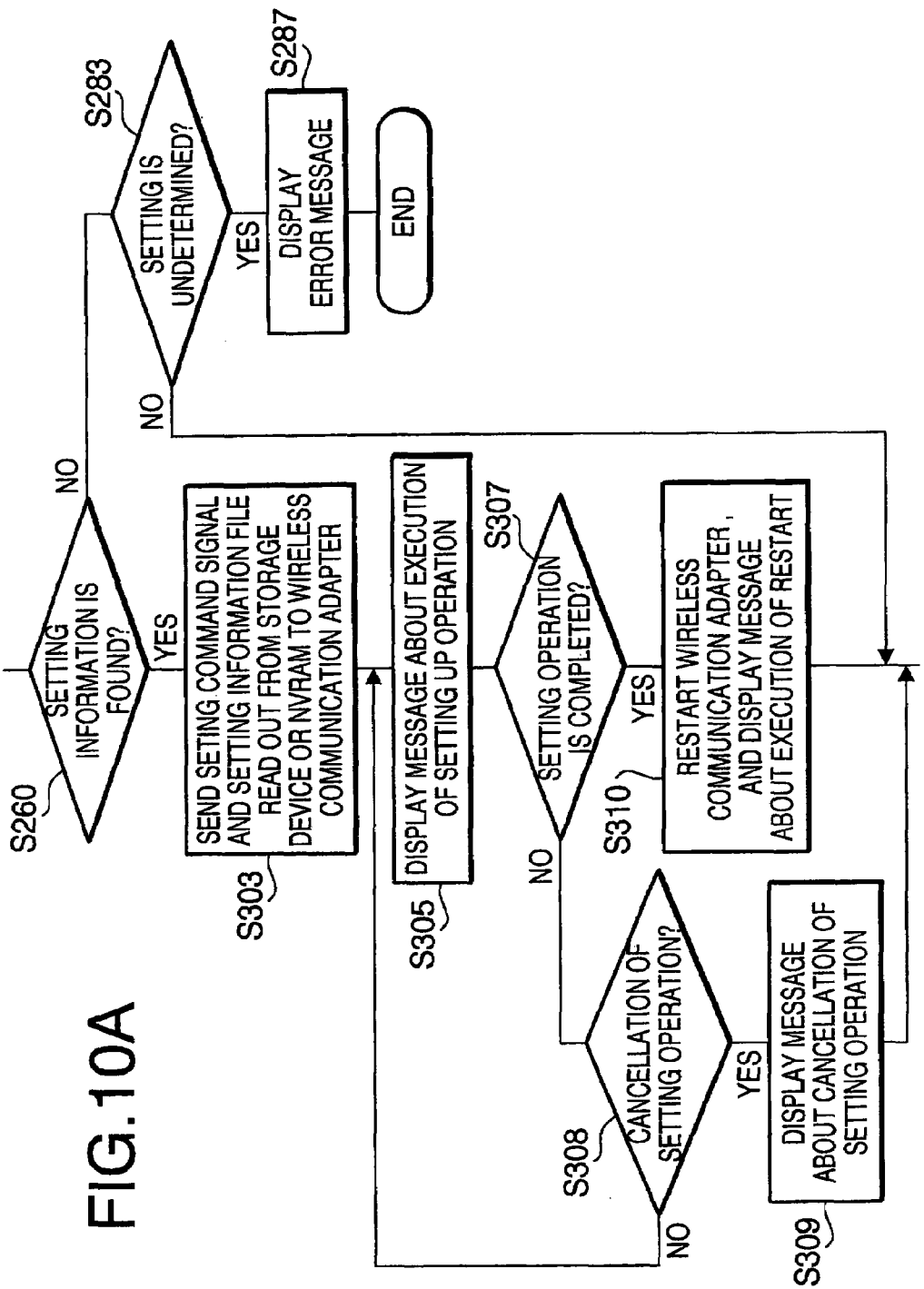
FIG. 10A shows a wireless adapter updating process.
Figure 10B:
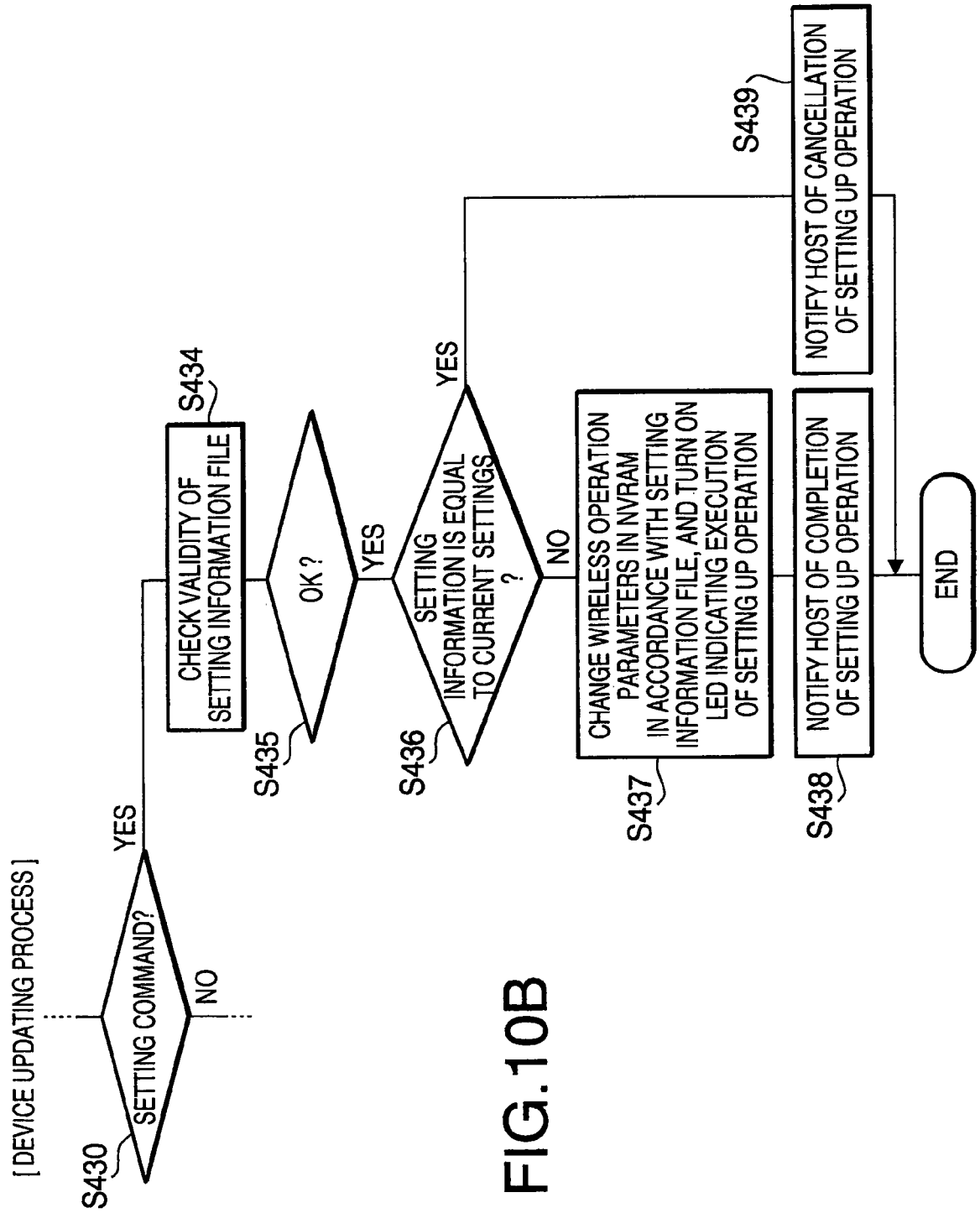
FIG. 10B shows a device updating process.

FIG. 10A shows a wireless adapter updating process according to the variation. The process shown in FIG. 10A is configured by modifying the wireless adapter updating process shown in FIG. 8. In FIG. 10A only the modified part of the wireless updating process of FIG. 8 is illustrated. FIG. 10B shows an illustrative device updating process according to the variation. The process shown in FIG. 10B is configured by modifying the device updating process shown in FIG. 9. In FIG. 10B, only modified part of the device updating process of FIG. 9 is illustrated. In FIGS. 10A and 10B, to steps which are the same as those described above, the same reference numbers are assigned, and explanations thereof will not be repeated.

The wireless adapter updating process of FIG. 10A is configured by replacing steps S270, S280, S290, and S300 with steps S303, S305, S307, S308 and S309. As shown in FIG. 10A, if the judgment result of step S260 is "YES", control proceeds to step S303. In step S303, the main control unit 11 of the multifunction device 10 sends the setting information file stored in the NVRAM 19 or in the storage device 50 along with a setting command signal to the wireless communication adapter 30.

Next, in step S305, the main control unit 11 displays a message indicating that the set up operation is running on the display unit 21. The message is kept displayed on the display unit 21 until the main control unit 11 receives a notification about the completion of the set up operation or a notification about the cancellation of the set up operation from the wireless communication adapter 30. If the main control unit 11 receives the notification about the completion of the set up operation from the wireless communication adapter 30 (S307: YES), control proceeds to step S310. If the received notification is not the notification about the completion of the set up operation but the notification about the cancellation of the set up operation (S307: NO, S308: YES), the main control unit 11 displays a message indicating the cancellation of the set up operation. Then, steps from step S210 are executed.

If it is judged in step S308 that the received notification is not the notification about the cancellation of the set up operation (S308: NO), control returns to step S305.

The device updating process of FIG. 10B is configured by replacing step S433 with steps S434, S435, S436, S437, S438 and S439. As shown in FIG. 10B, if the main control unit 31 of the wireless communication adapter 30 judges that the command provided by the multifunction device 30 is the setting command (S430: YES), control proceeds to step S434. In step S434, the main control unit 31 checks the validity of the setting information file. Specifically, the main control unit 31 checks whether the description of the setting information file complies with predetermined specifications.

Next, in step S435, the main control unit 13 judges whether the setting information file is valid. If the setting information file is invalid (S435: NO), control proceeds to step S439 where the main control unit 31 sends the notification about the cancellation of the set up operation to the multifunction device 10.

If the setting information file is valid (S435: YES), control proceeds to step S436. In step S436, the main control unit 13 judges whether parameters contained in the received setting information file are equal to the current wireless operation parameters currently stored in the NVRAM 35. If the parameters contained in the received setting information file are equal to the current wireless operation parameters currently stored in the NVRAM 35 (S436: YES), control proceeds to step S439. If the parameters contained in the received setting information file are not equal to the current wireless operation parameters currently stored in the NVRAM 35 (S436: NO), control proceeds to step S437.

In step S437, the main control unit 31 sets up the wireless operation parameters (i.e., changes the wireless operation parameters in the NVRAM 35) based on the setting information file transferred from the multifunction device 10. Further, in step S437, the main control unit 13 notifies a user that the set up operation is running through the display unit 37. After the set up operation (S437) is finished, the main control unit 31 sends the notification about the completion of the set up operation to the multifunction device 10 (S438). Then, the device updating process terminates. In step S439, the main control unit 31 sends the notification about the cancellation of the set up operation to the multifunction device 10.

According to the above mentioned variation, the multifunction device 10 is not required to have the function of analyzing the setting information file. It is understood that since the multifunction device 10 does not analyze the setting information file, setting up of wireless communication operation for different wireless communication adapters can be attained by use of the storage device 50 and the multifunction device 10.

In certain aspects of the above mentioned wireless communication system 1, the wireless operation parameters are stored in the wireless communication adapter 30 and the wireless communication adapter 30 operates to start the set up operation responsive to the setting command provided by the multifunction device 10. However, in other aspects the wireless communication system 1 may be configured such that the multifunction device 10 stores the wireless operation parameters. That is, in this aspect, the multifunction device 10 changes the wireless operation parameters in accordance with the setting information file provided by the storage device 50 and to control the wireless communication adapter 30 in accordance with the wireless operation parameters.

In this aspect, the multifunction device 10 may be configured to write the electronic certificate obtained from the storage device 50 into a predetermined memory area in the NVRAM 19 to which a task controlling the wireless communication adapter 30 refers.

In the above mentioned aspects, the wireless communication adapter 30 is configured to communicate with devices 5 using a radio signal. However, in other aspects the wireless communication adapter 30 may be an IrDA (InfraRed Data Association) adapter communicating with devices using infrared light.

The wireless communication adapter 30 may be one of a network adapter based on the Bluetooth™ standard, and a network adapter for UWB (Ultra Wide Band).

In the above mentioned aspects, the USB interface is used as a general-purpose interface between the multifunction device 10 and the storage device 50 (or the wireless communication adapter 30). In other aspects, an interface based on the IEEE 1394 may be used in place of the USB interface.

In the above mentioned aspects, the multifunction device 10 is provided with USB connectors 25a. However, even if the multifunction device 10 is configured to have a single USB interface connector, the set up of the wireless communication adapter 30 may also be attained through use of the storage device 50 and the multifunction device 10.

In the wireless adapter updating process shown in FIG. 8 or FIG. 10B, whether to execute the set up of the wireless communication operation depends on the check result of step S290 or S436. However, the wireless adapter updating process may be configured such that if the result of step S290 (or S436) is "NO", the main control unit 11 (or 31) allows a user to decide whether to execute the set up of the wireless communication operation. With this configuration, the user can decide whether to start the set up of the wireless communication operation.

In step S290 or S436 of the above mentioned configuration, the judgment as to whether the setting information file is equal to the current settings of the wireless communication adapter 30 is made. As an alternative to such a configuration, judgment as to whether the settings of the wireless communication adapter 30 are default settings may be made in step S290 or S436 so that the set up of the wireless communication function can be executed if the settings of the wireless communication adapter 30 are the default settings. With this configuration, the update of settings from the default setting is securely performed.

The judgment as to whether the settings of the wireless communication adapter is the default settings can be made by using a flag which is set (or reset) when the settings of the wireless communication adapter 30 are changed from the default setting, or by storing the default settings to a memory (e.g., a ROM) so as to compare the default settings with the setting information file.

If the wireless adapter updating process is configured such that the setting information file is deleted from the NVRAM 19 after use of the setting information file, copying different information from the storage device to the NVRAM 19 becomes easier. If the wireless adapter updating process is configured such that the setting information file is not deleted from the NVRAM 19 after using the setting information file, set up for applying the same settings to wireless communication adapters becomes easy. In this aspect, the user is only required to attach or detach each wireless communication adapter to or from the multifunction device 10. It is understood that such an advantage may also be attained if the setting information file is stored in the RAM 11b as long as the power of the multifunction device 10 is ON.

The wireless communication system may be configured such that an image processing device (e.g., the multifunction device 30) stores parameters defining a wireless communication operation, and configured such that the image processing device controls the wireless communication adapter connected to the image processing device according to the stored parameters. Alternatively, in some aspects, the wireless communication system may be configured such that the wireless communication adapter stores parameters defining a wireless communication operation and the image processing device controls the wireless communication adapter to cause the wireless communication adapter to configure the wireless communication operation according to the stored parameters.

What is claimed is:

1. A wireless communication system, comprising:
    a wireless communication adapter configured for wireless communication;
    a storage device configured to store setting information for the wireless communication adapter, the setting information obtained from a physically separate computing device; and
    a non-wireless device including a connector configured to support plug and play functionality and further configured to selectively connect to one of the storage device and the wireless communication adapter,
    wherein the non-wireless device includes:
        a detection unit configured to detect connection to the connector each time a connection to the connector is made,
        a memory configured to store setting information for the wireless communication adapter, and
        a controller configured to:
            judge whether one of the storage device and the wireless communication adapter is connected to the connector in response to the detection of a connection to the connector by the detection unit,
            obtain the setting information stored in the storage device through the connector and store the obtained setting information in the memory if it is judged that the storage device is connected to the connector, and
            obtain the setting information stored in the memory and apply the setting information to the wireless communication adapter through the connector if it is judged that the wireless communication adapter is connected to the connector,
        wherein the setting information enables the non-wireless device to communicate wirelessly when the setting information is obtained by the non-wireless device and when the wireless communication adapter is connected via the connector to the non-wireless device, and
    wherein the wireless communication adapter performs wireless communication in accordance with the setting information which is applied by the controller, and
    wherein the wireless communication adapter, the storage device, and the non-wireless device are physically separable from each other.

2. The wireless communication system according to claim 1, wherein:
    the controller is configured to apply the setting information to the wireless communication adapter by generating a first command signal based on the setting information, and sending the first command signal to the wireless communication adapter; and
    the wireless communication adapter is configured to perform wireless communication in accordance with the first command signal after receiving the first command signal.

3. The wireless communication system according to claim 2, wherein:
    the first command signal generated by the controller instructs the wireless communication adapter to configure a wireless communication operation in accordance with the setting information; and the wireless communication adapter operates to configure the wireless communication operation in accordance with the first command signal provided by the controller of the non-wireless device.

4. The wireless communication system according to claim 2, wherein the controller is configured to generate a second command signal instructing the wireless communication adapter to reboot the wireless communication operation, and is configured to send the second command signal to the wireless communication adapter after the first command signal is sent to the wireless communication adapter.

5. The wireless communication system according to claim 2, wherein the controller is configured to judge whether an adapter connected to the connector of the non-wireless device is a communication adapter configured to perform wireless communication in accordance with the setting information, and is configured to send the first command signal only if it is judged that the connected adapter is the communication adapter.

6. The wireless communication system according to claim 1, wherein the controller obtains an electronic certificate from the storage device if the storage device is connected to the connector of the non-wireless device.

7. The wireless communication system according to claim 6, wherein the controller is configured to generate a third command signal instructing the wireless communication adapter to import the electronic certificate, and is configured to send the third command signal and the electronic certificate to the wireless communication adapter so that the electronic certificate is imported into the wireless communication adapter.

8. The wireless communication system according to claim 1, wherein the controller is configured to obtain firmware data for the wireless communication adapter from the storage device if the storage device is connected to the connector of the non-wireless device.

9. The wireless communication system according to claim 8, wherein the controller is configured to generate a fourth command signal instructing the wireless communication adapter to update firmware, and is configured to send the fourth command signal and the firmware data for the wireless communication adapter to the wireless communication adapter.

10. The wireless communication system according to claim 1, wherein the controller is configured to obtain firmware data for the non-wireless device from the storage device if the storage device is connected to the non-wireless device via the connector, and is configured to update firmware of the non-wireless device according to the firmware data for the non-wireless device.

11. The wireless communication system according to claim 1, wherein the controller of the non-wireless device includes:
a first judging system configured to judge whether the storage device is connected to the interface; and
a second judging system configured to judge whether the wireless communication adapter is connected to the interface.

12. The wireless communication system according to claim 1, wherein:
the controller is configured to forward the setting information to the wireless communication adapter if the storage device is connected to the connector of the non-wireless device; and the wireless communication adapter is operable to configure the wireless communication operation in accordance with the setting information forwarded by the controller of the non-wireless device.

13. A device, comprising:
a connector configured to support plug and play functionality, further configured to be selectively connected to one of a wireless communication adapter and an external storage device for storing setting information obtained from a physically separate computing device;
a detection unit configured to detect a connection to the connector each time a connection to the connector is made;
a memory in which the setting information is stored; and
a controller configured to:
judge whether one of the storage device and the wireless communication adapter is connected to the connector in response to the detection unit detecting a connection to the connector,
obtain the setting information stored in the storage device through the connector and store the obtained setting information in the memory if it is judged that the storage device is connected to the connector; and
obtain the setting information stored in the memory and apply the setting information to the wireless communication adapter through the connector if it is judged that the wireless communication adapter is connected to the controller,
wherein the setting information enables the non-wireless device to communicate wirelessly when the setting information is obtained by the non-wireless device and when the wireless communication adapter is connected via the connector to the non-wireless device;
wherein the wireless communication adapter, the storage device, and the device are physically separable from each other.

14. The device according to claim 13, wherein the controller is configured to receive a signal, to judge whether to obtain the setting information from the storage device based on the received signal, and to judge whether to apply the setting information to the wireless communication adapter based on the received signal.

15. The device according to claim 14, wherein reception of the signal results from connection of the storage device or the wireless communication adapter to the connector.

16. The device according to claim 14, wherein the signal is obtained by the controller via the connector as data.

17. The device according to claim 14, wherein the signal obtained by the controller includes data defined in a standard, the data representing the type of the storage device or wireless communication adapter connected to the connector.

18. A method of setting up a wireless communication adapter, the method being carried out on a non-wireless device having a connector configured to support plug and play functionality and further configured to be selectively connected to one of the wireless communication adapter and an external storage device for storing setting information obtained from a physically separate computing device, the method comprising the steps of:
judging that one of the storage device and the wireless communication adapter is connected to the connector in response to detection of the connection to the connector;
obtaining the setting information stored in the storage device through the connector and storing the obtained setting information in a memory of the device if it is judged that the storage device is connected to the connector;

obtaining the setting information stored in the memory and applying the setting information to the wireless communication adapter through the connector if it is judged that the wireless communication adapter is connected to the connector, wherein the setting information enables the non-wireless device to communicate wirelessly when the setting information is obtained by the non-wireless device and when the wireless communication adapter is connected via the connector to the non-wireless device, and wherein the wireless communication adapter, the storage device, and the non-wireless device are physically separable from each other.

19. A computer readable medium for use on a non-wireless device, the computer readable medium having computer executable instructions stored thereon to carry out a method of setting up a wireless communication adapter, the non-wireless device having a connector configured to support a plug and play functionality and further configured to be selectively connected to one of the wireless communication adapter and an external storage device for storing setting information obtained from a physically separate computing device, the method comprising the steps of:

judging that one of the storage device and the wireless communication adapter is connected to the connector in response to detection of the connection to the connector;

obtaining the setting information stored in the storage device through the connector and storing the obtained setting information in a memory of the device if it is judged that the storage device is connected to the connector; and obtaining the setting information stored in memory and applying the setting information to the wireless communication adapter through the connector if it is judged that the wireless communication adapter is connected to the connector, wherein the setting information enables the non-wireless device to communicate wirelessly when the setting information is obtained by the non-wireless device and when the wireless communication adapter is connected via the connector to the non-wireless device, and wherein the wireless communication adapter, the storage device, and the non-wireless device are physically separable from each other.

\* \* \* \* \*